(12) United States Patent
Lin

(10) Patent No.: US 8,242,893 B1
(45) Date of Patent: Aug. 14, 2012

(54) FILTER ASSEMBLY WITH RFID

(75) Inventor: Ching Shiung Lin, Pingtung (TW)

(73) Assignee: Kemflo International Co., Ltd. (TW)

( * ) Notice: Subject to any disclaimer, the term of this patent is extended or adjusted under 35 U.S.C. 154(b) by 634 days.

(21) Appl. No.: 12/459,407

(22) Filed: Jul. 1, 2009

Related U.S. Application Data

(60) Provisional application No. 61/133,600, filed on Jul. 1, 2008.

(51) Int. Cl.
*H04Q 5/22* (2006.01)
*G05B 19/00* (2006.01)
*B60R 25/00* (2006.01)

(52) U.S. Cl. .................. 340/10.42; 340/5.61; 340/10.5; 340/5.31; 340/5.73

(58) Field of Classification Search ........... 235/375–385
See application file for complete search history.

(56) References Cited

U.S. PATENT DOCUMENTS 7,212,637 B2 * 5/2007 Salisbury ...................... 380/270
2007/0272758 A1 * 11/2007 Kulkarni et al. ............. 235/486

OTHER PUBLICATIONS http://en.wikipedia.org/wiki/Radio-frequency_identification.
http://en.wikipedia.org/wiki/Transporter.
http://en.wikipedia.org/wiki/Image:RSA-SecurID-Tokens.jpg.
http://en.wikipedia.org/wiki/Challenge-response_authentication.
http://en.wikipedia.org/wiki/Radio_frequency.
http://en.wikipedia.org/wiki/Proximity_card.

* cited by examiner

*Primary Examiner* — Brian Zimmerman
*Assistant Examiner* — Omeed Alizada
(74) *Attorney, Agent, or Firm* — Faegre Baker Daniels LLP

(57) ABSTRACT

A filter assembly that includes a filter housing having a radio frequency identification reader and a blocker; and a filter cartridge insertable into the filter housing having a radio frequency identification tag that the radio frequency reader on the housing can read to determine if the filter cartridge is of the proper type. When the proper filter cartridge is inserted in the filter housing and the tag is matched by the radio frequency identification reader, the blocker will allow the cartridge to go in. When the radio frequency identification reader does not match the tag on the filter cartridge, the blocker will prevent the filter cartridge from being fully inserted into the housing.

19 Claims, 4 Drawing Sheets

FILTER ASSEMBLY WITH RFID

This application claims the benefit of U.S. Provisional Patent Application Ser. No. 61/133,600 filed Jul. 1, 2008, the complete disclosure of which is hereby expressly incorporated by reference.

BACKGROUND OF THE INVENTION

The subject invention relates to a filter assembly, and in particular, to a filter assembly with radio frequency identification to assure that only a proper filter cartridge is inserted in the assembly.

Filter assemblies and filter cartridges are widely used to improve the taste and remove contaminants of drinking water and ice cubes. Filter cartridges may also be used to remove minerals to reduce the hardness of water and/or prevent staining. It is common for filter assemblies to include a housing that has fittings for attachment of a water line and is configured to receive a replaceable filter cartridge. Typically, one of the fittings will be an inlet fitting, and the other will be an outlet fitting, so that when the housing is connected in a water line, water will flow into the housing through the filter cartridge to be filtered and out the outlet fitting and back into the water line for use.

It is common that the filter cartridges are replaceable, as over a period of time and use, the filter's efficiency is reduced. The useful life may depend upon the quantity and type of contaminants in the water being filtered and the amount of water passed through the filter cartridge. Accordingly, most manufacturers typically advise replacing the filter cartridge with a new one after a certain period of time or after a pre-designated amount of water is filtered through the filter.

Furthermore, it may be desirable to use a different or specialized filter cartridge depending upon the region of the country, or local water conditions/amount and type of contaminants in the water. As is known in the art, certain types of filter cartridges are better for removing specific contaminants than others.

Accordingly, it would be desirable to provide a filter assembly that can identify whether the type of filter cartridge being inserted is the best or proper type for the specific water conditions.

The subject invention utilizes a Radio Frequency IDentifier/identification (RFID) for determining the presence or lack thereof of a proper or recommended filter cartridge. Although it is believed the disclosed use in a filter assembly is unique, RFID technology is well known for other uses. For example, RFID technology is common for improving the efficiency of inventory tracking and management; providing secured restricted entry into a building or room; for use in parking lots and garages to determine or identify authorized entrants, whereby upon making an RFID identification, a gate may be raised; or for providing identification of charge and/or debit cards. RFID functions rely on storing and remotely retrieving data using devices known as RFID tags or transponders. An RFID tag is a device that can be applied to or incorporated in a product or device to enable identification with the use of radio waves. The distance at which tags can be read varies, typically from an inch or two to several meters away from a reader.

Typically, RFID tags include at least two parts, one being an integrated circuit that stores and processes information to modulate and demodulate a radio frequency signal. The other part is in an antenna for receiving and transmitting a signal. Chipless RFID tags are also available that can provide discrete identification without the need of an integrated circuit, whereby the tags can be printed directly onto the desired device.

RFID tags are available in three general types. These include passive, active, or semi-passive, which are sometimes known as battery-assisted tags. Passive tags require no internal battery source and are powered by a reader attempting to read the tag. A passive RFID functions with the use of a minute electrical current that is induced in the tag's antenna by an incoming radio frequency signal. This provides just enough power for the integrated circuit in the tag to power up and transmit a response. One way this is accomplished is that the tag reader presents a field that excites a coil in the tag and charges a capacitor, which in turn energizes and powers the integrated circuit. The integrated circuit then transmits the identification number via a coil to the tag reader.

On the other hand, semi-passive and active tags require a power source, which is typically a small battery in order to transmit a response to the reader. Active and semi-active passive tags may transmit at higher power levels and at a greater range than passive tags; however, they tend to be larger in size and price than passive tags.

SUMMARY OF THE INVENTION

A filter assembly is provided that in one embodiment of the invention includes a filter housing that has a radio frequency identification reader and a blocker; and a filter cartridge insertable into the filter housing and having a radio frequency identification tag that the radio frequency reader on the housing can read to determine if the filter cartridge is of the proper type.

When the proper filter cartridge is inserted in the filter housing and the tag is matched by the radio frequency identification reader, the blocker will allow the cartridge to go in. When the radio frequency identification reader does not match the tag on the filter cartridge, the blocker will prevent the filter cartridge from being fully inserted into the housing.

The blocker may include a plunger, a solenoid and a spring. The spring biases the plunger to a locked position to prevent an improper filter cartridge from being installed into the filter housing. When a proper filter cartridge is inserted in the filter housing and the tag is matched by the radio frequency identification reader, the solenoid is energized to allow the filter cartridge to push the plunger into a retracted position so that the filter cartridge can be inserted for use in the filter housing. The filter housing may include a hollow interior cavity configured to receive the filter cartridge, and the plunger is movable in a direction approximately perpendicular to the axis of the cavity.

The filter cartridge includes a housing, and the radio frequency reader may be attached on the exterior of the filter cartridge housing. The radio frequency identification tag can have an arched configuration to match the contour of the exterior of the filter cartridge housing, wherein the filter housing includes an open end leading into the interior cavity, the open end for receipt of the filter cartridge, and the radio frequency identification reader is located closer to the open end of the filter housing than the blocker. The radio frequency identification reader may read the radio frequency identification tag on the filter cartridge being inserted into the filter housing before the filter cartridge encounters the plunger.

It is also a feature of the invention to provide a method of assuring that only a proper filter cartridge is received in a filter assembly, that includes the steps of providing a filter housing having an interior cavity and open end leading into the cavity, the filter housing further having a blocker and a radio frequency identification reader attached thereto; providing a filter cartridge having a radio frequency identification tag attached thereto; and inserting the filter cartridge into the cavity through the open end in the filter housing so that the blocker will prevent complete insertion of the filter cartridge into the filter housing if the radio frequency identification tag does not match the radio frequency identification reader.

The blocker may include a plunger that encounters the filter cartridge to prevent complete insertion of the filter cartridge if the radio frequency identification tag does not match the radio frequency identification reader, and may further include the step of matching the radio frequency identification tag and the radio frequency identification reader, so that the blocker will permit the filter cartridge to be fully installed into the filter housing.

The method may include the step of activating a solenoid to permit the filter cartridge to push the plunger out of the cavity and to permit the filter cartridge to be fully inserted into the filter housing. The method may also include the step of providing an alignment mechanism on the filter cartridge and filter housing to align the radio frequency identification tag and radio frequency identification reader. \

The blocker may include a spring biasing the plunger to a locked position with a portion of the plunger extending into the interior cavity of the filter housing. If the radio frequency identification tag matches the radio frequency identification reader, the filter cartridge can push the plunger in a direction generally perpendicular to an axis of the interior cavity and out of the cavity.

The method may further include the steps of providing a plunger lock, and withdrawing the plunger lock when the radio frequency identification tag matches the radio frequency identification reader. The method may further include the step of providing a solenoid, wherein the solenoid is activated when the radio frequency identification tag matches the radio frequency identification reader, and activation of the solenoid withdraws the plunger lock. The method may further include the step of withdrawing the filter cartridge, wherein the spring biases the plunger back to the locked position and secured thereto by the plunger lock.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Figure 1:
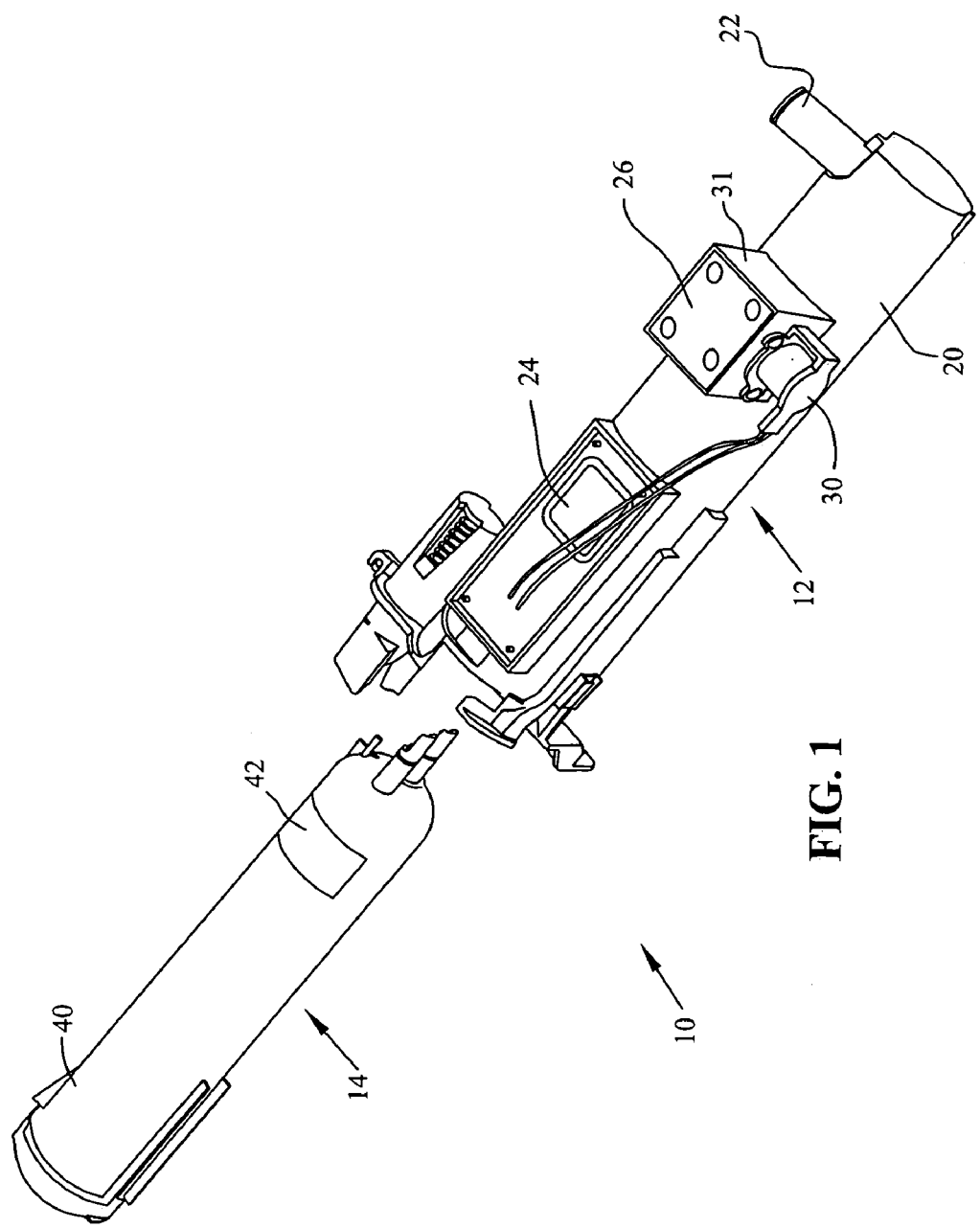
FIG. 1 shows a perspective view of one embodiment of a filter assembly including a filter housing having an RFID reader and a filter cartridge having an RFID tag with the filter cartridge removed from the filter housing.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Figure 2:
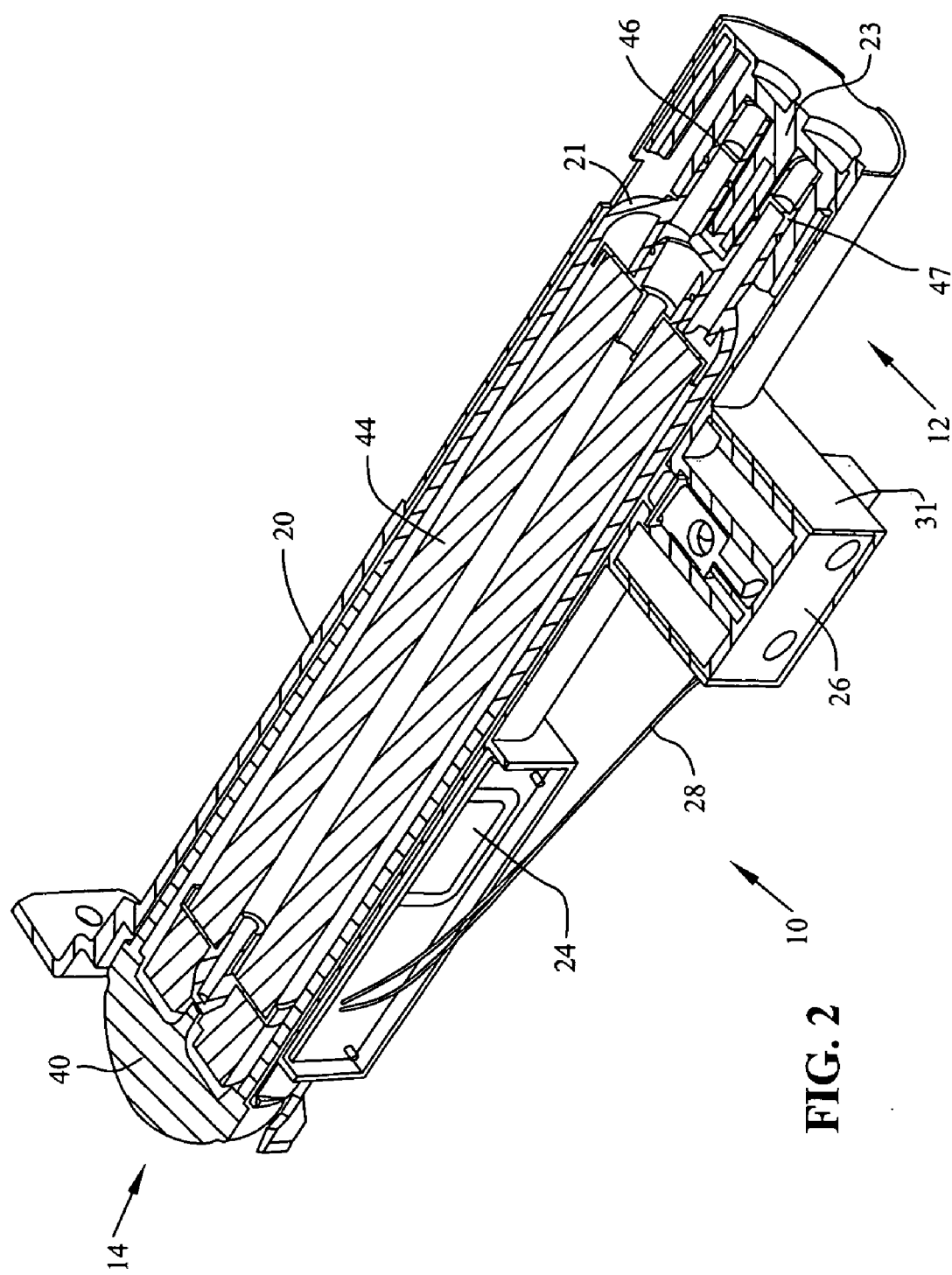
FIG. 2 is a cross sectional view of the filter assembly of FIG. 1 with a filter cartridge having a matching RFID tag inserted into the filter housing.
Figure 3:
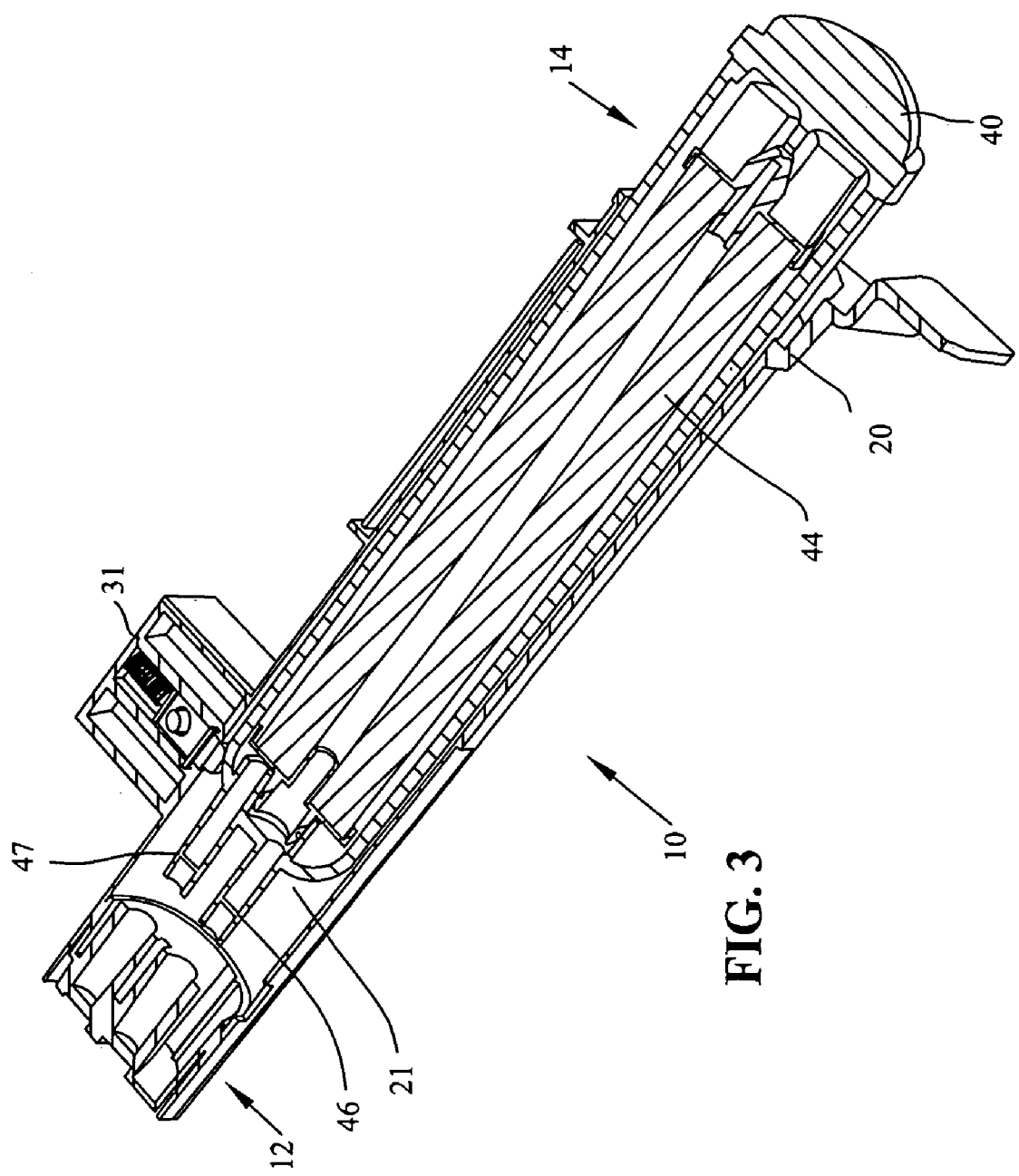
FIG. 3 is a cross sectional view of the filter assembly of FIG. 1, wherein the RFID reader failed to match an RFID tag, and the filter housing prevents the filter cartridge from being fully inserted into the filter housing.

Referring now to FIG. 1, one embodiment of a filter assembly in accordance with the subject invention is shown, generally indicated as 10. Filter assembly 10 includes a filter housing, generally indicated as 12, and a filter cartridge, generally indicated as 14. Filter housing 12 includes a shell 20, a hollow interior cavity 21 (see FIG. 3) defined by shell 20, an inlet or outlet fitting 22, a cartridge fitting saddle 23, an RFID reader 24, and a blocker 26. Shell 20 may be molded from a plastic material or made using other suitable materials and/or methods. Interior cavity 21 is configured to receive filter cartridge 14, as best shown in FIG. 2. Inlet or outlet fitting 22 is one of at least two fittings on the housing to provide an inlet and outlet for water to enter housing 12, circulate through filter cartridge 14 and exit the housing (as is well known to one skilled in the art).

RFID reader 24 is of a type known to those in RFID technology, and includes a pair of electrical leads 28 connected to blocker 26, in order to activate the blocker as discussed below. Blocker 26 includes a solenoid 30 (FIG. 1), a blocker housing, a plunger 32, a spring 34, and a plunger lock 35 (FIG. 4).

Referring again to FIG. 1, filter cartridge 14 includes a cartridge housing 40 and an RFID tag 42, which is of a type well known in the art of RFID technology. Now referring to FIGS. 2 and 3, filter cartridge 14 also includes a filter 44, and inlet/outlet fittings 46 and 47.

Filter assembly 10 of the subject invention and disclosed embodiment is designed to include a radio frequency identification of the filter cartridge in order to assure that a proper filter cartridge is installed in filter housing 12. The filter cartridge to be inserted into filter housing 12 must have a matching RFID tag 42 in order to be accepted into the filter housing. RFID reader 24 and blocker 26, along with RFID tag 42, are the elements that facilitate this feature.

Figure 4:
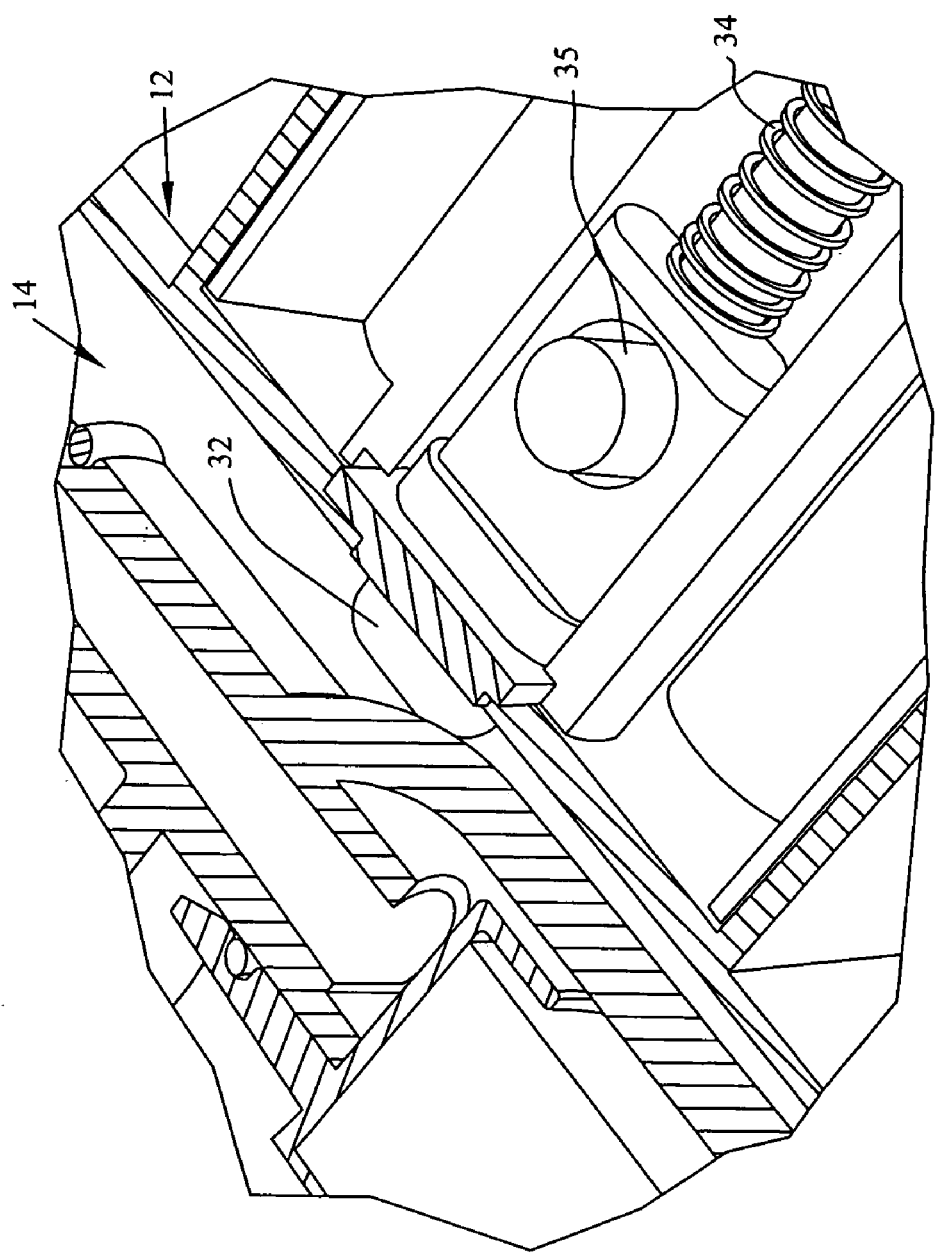
FIG. 4 is an enlarged view of a blocker preventing the filter cartridge from being inserted into the filter housing when the RFID reader cannot match an RFID tag on the filter cartridge.

In a normal mode, spring 34 pushes plunger 32 into hollow interior cavity 21 of filter housing 12, as shown in FIG. 4. Furthermore, as solenoid 30 includes plunger lock 35 that in the normal position locks or prevents plunger 32 from being retracted into blocker housing 31 (see FIGS. 2 and 4). As such, if filter cartridge 14 does not contain an RFID tag or the RFID tag does not match the identification that the RFID reader is programmed to accept, plunger 32 will be locked into the position shown in FIGS. 3 and 4 extending into interior cavity 21. In this position, cartridge housing 40 will contact plunger 32, as shown in FIG. 4, and will thusly prevent the filter cartridge from being completely and fully inserted into filter housing 12.

On the other hand, if RFID reader 24 detects a matching RFID tag 42, the reader will send an electrical signal over electrical leads 28 to solenoid 30. Solenoid 30 will retract plunger lock 35 that prevents plunger 32 from being retracted into blocker housing 31 so that cartridge housing 40 will push plunger 32 out of interior cavity 21, allowing filter cartridge 14 to be fully installed in filter housing 12, as shown in FIG. 2. In the fully installed position shown in FIG. 2, inlet/outlet fittings 46 and 47 of filter cartridge 14 will be fully installed in cartridge fitting saddle 23, allowing water to be circulated through the filter.

When filter cartridge 14 is withdrawn for replacement, spring 34 will again push plunger 32 back into interior cavity 21 and be locked again until the reader reads another RFID tag match, so that a new proper filter cartridge can be installed.

While the invention has been taught with specific reference to these embodiments, one skilled in the art will recognize that changes can be made in form and detail without departing from the spirit and scope of the invention. Therefore, the described embodiments are to be considered, therefore, in all respects only as illustrative and not restrictive. As such, the scope of the invention is indicated by the following claims rather than by the description.

The invention claimed is:

1. A filter housing including:
   a filter housing having a radio frequency identification reader and a blocker;
   a filter cartridge insertable into the filter housing and having a radio frequency identification tag that is readable by the radio frequency reader on the housing to determine if the filter cartridge is of the proper type;
   wherein when the proper filter cartridge is inserted in the filter housing and the tag is matched by the radio frequency identification reader, the blocker will allow the cartridge to be inserted.

2. The filter assembly as set forth in claim 1, wherein when the radio frequency identification reader does not match the tag on the filter cartridge, then the blocker will prevent the filter cartridge from being fully inserted into the housing.

3. The filter assembly as set forth in claim 2, wherein the blocker includes a plunger, a solenoid and a spring, the spring biases the plunger to a locked position to prevent an improper filter cartridge from being installed into the filter housing.

4. The filter assembly as set forth in claim 2, wherein when a proper filter cartridge is inserted in the filter housing and the tag is matched by the radio frequency identification reader, the solenoid is energized to allow the filter cartridge to push the plunger into a retracted position so that the filter cartridge can be inserted for use in the filter housing.

5. The filter assembly as set forth in claim 3, wherein the filter housing includes a hollow interior cavity configured to receive the filter cartridge, and the plunger is movable in a direction approximately perpendicular to the axis of the cavity.

6. The filter assembly as set forth in claim 4, wherein the filter cartridge includes a housing, and the radio frequency reader is attached on the exterior of the filter cartridge housing.

7. The filter assembly as set forth in claim 5, wherein the radio frequency identification tag has an arched configuration to match the contour of the exterior of the filter cartridge housing.

8. The filter assembly as set forth in claim 6, wherein the filter housing includes an open end leading into the interior cavity, the open end for receipt of the filter cartridge, and the radio frequency identification reader is located closer to the open end of the filter housing than the blocker.

9. The filter assembly as set forth in claim 7, wherein the radio frequency identification reader reads the radio frequency identification tag on the filter cartridge being inserted into the filter housing before the filter cartridge encounters the plunger.

10. A method of assuring that only a proper filter cartridge is received in a filter assembly, including the steps of:
    providing a filter housing having an interior cavity and open end leading into the cavity, the filter housing further having a blocker and a radio frequency identification reader attached thereto;
    providing a filter cartridge having a radio frequency identification tag attached thereto; and
    inserting the filter cartridge into the cavity through the open end in the filter housing so that the blocker will prevent complete insertion of the filter cartridge into the filter housing if the radio frequency identification tag does not match the radio frequency identification reader.

11. The method of assuring that only a proper filter cartridge is received in a filter assembly as set forth in claim 10, wherein the blocker includes a plunger that encounters the filter cartridge to prevent complete insertion of the filter cartridge if the radio frequency identification tag does not match the radio frequency identification reader.

12. The method of assuring that only a proper filter cartridge is received in a filter assembly as set forth in claim 10, further including the step of matching the radio frequency identification tag and the radio frequency identification reader, so that the blocker will permit the filter cartridge to be fully installed into the filter housing.

13. The method of assuring that only a proper filter cartridge is received in a filter assembly as set forth in claim 12, including the step of activating a solenoid to permit the filter cartridge to push the plunger out of the cavity and to permit the filter cartridge to be fully inserted into the filter housing.

14. The method of assuring that only a proper filter cartridge is received in a filter assembly as set forth in claim 10, including the step of providing an alignment mechanism on the filter cartridge and filter housing to align the radio frequency identification tag and radio frequency identification reader.

15. The method of assuring that only a proper filter cartridge is received in a filter assembly as set forth in claim 11, wherein the blocker includes a spring biasing the plunger to a locked position with a portion of the plunger extending into the interior cavity of the filter housing.

16. The method of assuring that only a proper filter cartridge is received in a filter assembly as set forth in claim 15, wherein if the radio frequency identification tag matches the radio frequency identification reader, the filter cartridge pushes the plunger in a direction generally perpendicular to an axis of the interior cavity and out of the cavity.

17. The method of assuring that only a proper filter cartridge is received in a filter assembly as set forth in claim 16, further including the steps of providing a plunger lock, and withdrawing the plunger lock when the radio frequency identification tag matches the radio frequency identification reader.

18. The method of assuring that only a proper filter cartridge is received in a filter assembly as set forth in claim 17, further including the step of providing a solenoid, wherein the solenoid is activated when the radio frequency identification tag matches the radio frequency identification reader, and activation of the solenoid withdraws the plunger lock.

19. The method of assuring that only a proper filter cartridge is received in a filter assembly as set forth in claim 18, further including the step of withdrawing the filter cartridge, wherein the spring biases the plunger back to the locked position and secured thereto by the plunger lock.

* * * * *